July 19, 1960  E. G. FRIDRICH ET AL  2,945,976
ELECTROLUMINESCENT LAMP AND MANUFACTURE THEREOF
Filed Dec. 10, 1957  2 Sheets-Sheet 1
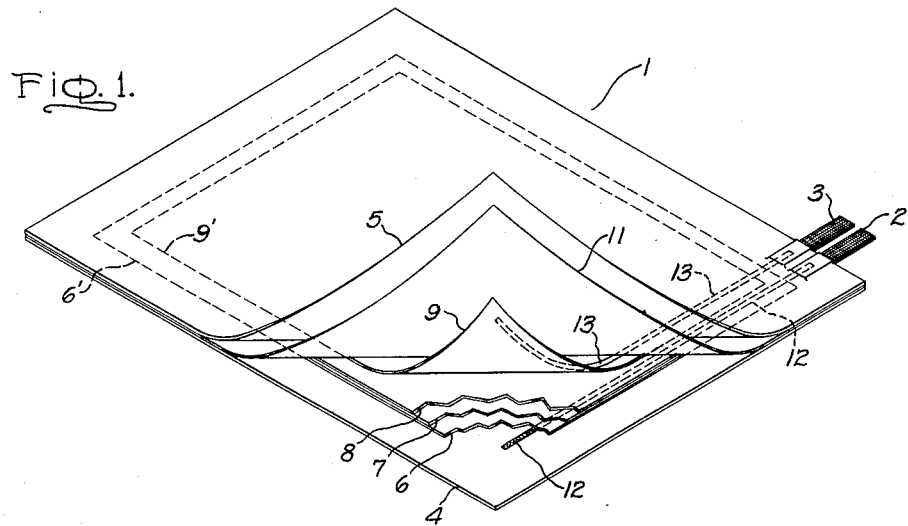
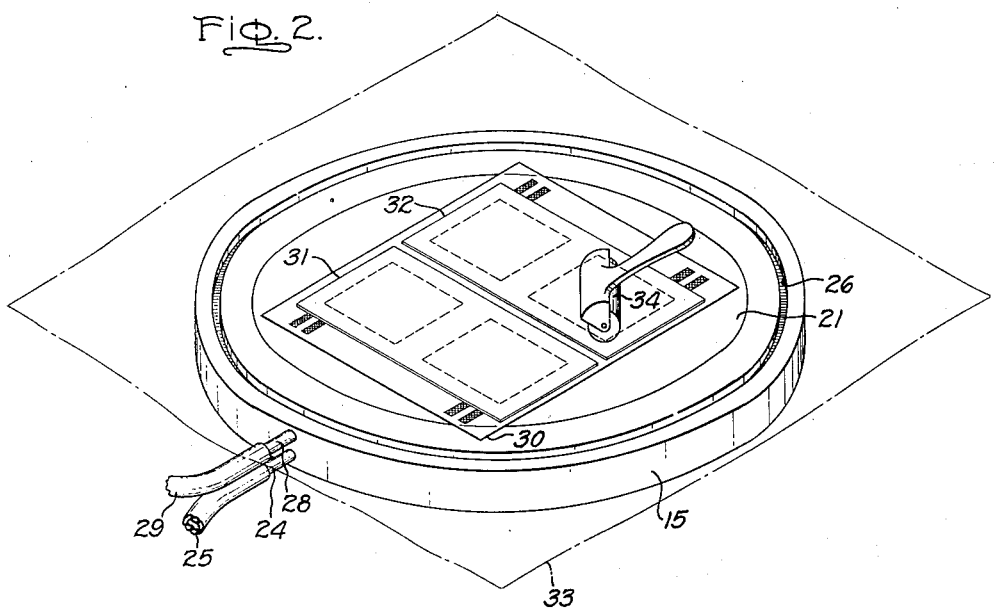
Inventors:
Elmer G. Fridrich,
Paul A. Dell,
by Their Attorney.

Inventors:
Elmer G. Fridrich,
Paul A. Dell,
by their Attorney.

United States Patent Office 2,945,976
Patented July 19, 1960

2,945,976
ELECTROLUMINESCENT LAMP AND MANUFACTURE THEREOF

Elmer G. Fridrich and Paul A. Dell, Cleveland, Ohio, assignors to General Electric Company, a corporation of New York Filed Dec. 10, 1957, Ser. No. 701,906

9 Claims. (Cl. 313—108)

This invention relates in general to electroluminescent lamps and more particularly to a flexible laminated electroluminescent cell. The invention is also concerned with the process and equipment used in the manufacture of such cells.

An electroluminescent cell comprises a layer of phosphor capable of generating light under the action of an electric field, sandwiched between a pair of conducting plates or films at least one of which is transparent or light-transmitting. In the type of electroluminescent cell described in Patent 2,774,004, Jaffe, assigned to the assignee of this invention, the transparent conducting plate or layer is a flexible conductive sheet of compacted glass fibers in the form of conducting glass cloth or paper. The glass cloth or paper is made conductive by subjecting it at a high temperature to the action of salts of metals such as indium, tin and cadmium, either alone or in combination, these salts decomposing to form a conductive film integrally united with the surface of the glass fibers.

The object of the invention is to provide a new and improved flexible laminated electroluminescent cell of rugged construction and having an improved seal resistant to penetration of moisture.

Another object of the invention is to provide an improved flexible laminated electroluminescent cell which is of substantially uniform brightness over its illuminated area and which is resistant to delamination when flexed or bent.

Another object of the invention is to provide an effective and practical process for manufacturing electroluminescent lamps in accordance with the invention.

A further object of the invention is to provide suitable apparatus for the manufacture of electroluminescent lamps in accordance with the invention.

An electroluminescent lamp in accordance with the invention comprises a flexible laminated assembly of phosphor and conductive layers encased in a thin envelope of thremoplastic material completely heat sealed all around its edges.

In a preferred embodiment, the electrically active parts of the cell comprise a thin aluminum foil overcoated first with a layer of barium titanate and then with a layer of an electroluminescent phosphor such as zinc sulfide, both barium titanate and zinc sulfide layers being bound in a plastic matrix of high dielectric constant. The phosphor layer is contacted by a thin sheet of conductive microfiber glass paper. The glass paper is impregnated with a thermoplasitc material such as low-density polyethylene which serves to bind it to the phosphor layer, thereby effectively laminating the aluminum foil and glass paper. The electrically active elements are encased in an envelope of a suitable thermoplastic material such as high-density polyethylene. The outer envelope affords mechanical protection to the electrically active elements and also serves to a substantail degree as a moisture barrier protecting the phosphor against the deleterious effects of moisture.

In order to obtain even brightness of the cell face, the laminating requirements are very exacting. The excitation of the phosphor layer is governed by the strength of the electric field and, because the layer is so thin, the slightest variation in thickness will result in uneven lighting of the finished lamp. For all except the smallest sizes of electroluminescent cells, that is excluding cells less than 2 inches on a side, it has proven extremely difficult to achieve sufficiently uniform pressure by conventional laminating methods to insure even lighting of the finished lamp. High-pressure areas where the phosphor is squeezed thinner are brighter, and low-pressure areas dimmer, resulting in appearance defects. Conventional techniques of padding the laminate, such as the use of paper and thermoplastic sheets alone or in various combinations of interleaving, have not offered a practical solution.

According to a feature of the invention, near to ideal conditions of pressure uniformity in laminating are obtained by the application of hydrostatic pressure to a thin flexible diaphragm such as a metal foil or a plastic sheet laid over an electroluminescent cell lay-up. This process produces electroluminescent cells of substantially uniform brightness and practically eliminates lateral flow or change in registry of the components during lamination.

According to another feature of the invention, a vacuum lay-up process is used to purge the laid-up components of an electroluminescent cell of gases, and at the same time to hold the parts in perfect registry until placed in the laminating press. The cell components are laid up on a flat polished plate consisting at least in part of porous metal to which a vacuum is applied. The flexible diaphragm to which pneumatic pressure is applied covers the laid-up components and extends over the porous portion of the vacuum plate. The vacuum plate vents the gases which would otherwise be trapped, as hydrostatic pressure is applied to the diaphragm, and is also effective in degassing and removing moisture present in the laid-up components.

For further objects and advantages and for a detailed description of a preferred electroluminescent lamp construction and of the process and equipment used in its manufacture in accordance with the invention, attention is now directed to the following description and accompanying drawings. The features of the invention believed to be novel will be more particularly pointed out in the appended claims.

In the drawings:

Fig. 1 is a pictorial view of a flexible laminated electroluminescent lamp embodying the invention, the various constituent layers being delaminated or peeled open at one corner to show the internal construction.

Fig. 2 is a pictorial view illustrating the lay-up of the cell components on a vacuum plate preparatory to the pneumatic laminating step.

Figure 3:
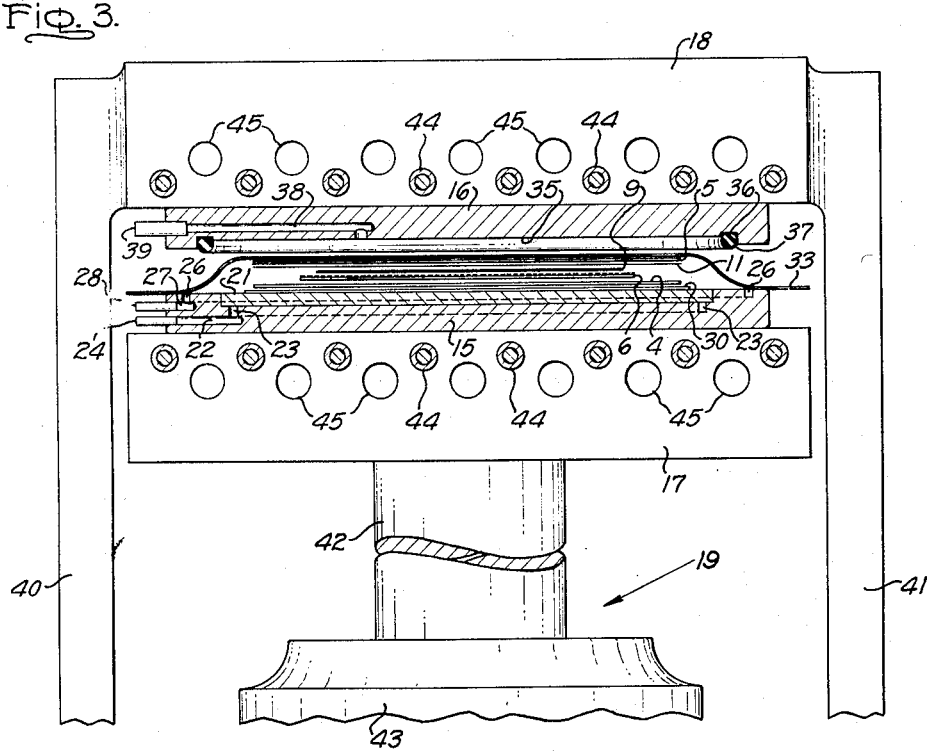
Fig. 3 is a vertical sectional view through the platens of a hydraulic press with the pressure and vacuum plates in place and the lay-up of electroluminescent cell components stacked on the vacuum plate.

Referring to the drawings and more particularly to Fig. 1, there is shown a flat rectangular electroluminescent cell 1 embodying the invention. The cell is made up of flexible components laminated together and is entirely sealed in plastic material. To give an idea of its flexibility, a cell such as illustrated approximately 4½″ along a side may readily be curved into a cylinder without damage. The cell is energized by applying an alternating voltage, for instance 118 volts, 60 cycle A.C., to the copper screen terminals 2, 3 projecting laterally from the edge of the plastic envelope.

The lowermost film or sheet 4 and the uppermost sheet 5 which form respectively the underside and the topside of the envelope in the finished lamp consist of sheets of thermoplastic material which flows under heat and pressure and welds together along the margins. The material selected must be reasonably tough and stable, in addition to being light-transmitting and preferably fairly flexible. Examples of suitable materials are polyethylene, polytetrafluoroethylene, chlorotrifluoro polyethylene, polystyrene, methyl methacrylate, vinylidene, vinyl chloride and fluoride polymers. A preferred material consists of high-density polyethylene film of 0.003 inch thickness. A rectangular sheet of thin metal foil 6 coated with an insulating layer 7 of high dielectric constant material and thereover a light producing layer 8 of electroluminescent phosphor is placed over the lowermost polyethylene sheet 4 leaving a clear margin all around. A sheet of conducting micro-fiber glass paper 9 is laid over the coated foil leaving a narrow margin of foil uncovered all around. Preferably a thinner sheet 11 of low-density polyethylene is placed over the conducting glass paper and conveniently is of the same size as the high-density polyethylene envelope sheets 4, 5 and extends to their margins. During the laminating process to be described shortly, the low-density polyethylene sheet 11 is substantially liquefied and part of it is forced through the porous glass paper. Thus the glass paper sheet is bound in place, being partly embedded in low density polyethylene sheet 11 and also cemented to the phosphor layer 8 on the aluminum foil. As shown in Fig. 1, the juxtaposed margins of the thermoplastic sheets project substantially beyond the edges of the metal foil and are fused or sealed together.

The coated metal foil 6 may consist of dead-soft annealed aluminum of 0.0008 inch thickness coated with a thin insulating layer of barium titanate dispersed in an organic polymeric matrix, and over-coated with an electroluminescent layer consisting of a phosphor such as zinc sulfide-zinc oxide with suitable activators such as copper, manganese, lead or silver, likewise dispersed in an organic polymeric matrix. Examples of organic polymeric matrices are cellulose nitrate, polyacrylates, methacrylates, polyvinyl chloride, cellulose acetate, alkyd resins, epoxy cements, and polymers of triallyl cyanurate, to which may be added modifying substances or plasticizers such as camphor, dioctyl phthalate, tricresyl phosphate and similar materials. A preferred organic polymeric matrix forming a dense tough film of high dielectric constant and good mechanical and thermal stability and consisting of cyanoethyl cellulose with suitable plasticizers is described and claimed in copending application Serial No. 701,907 of Mary S. Jaffe, filed of even date herewith, entitled "High Dielectric Constant Matrices for Electroluminescent Cells," and assigned to the same assignee as the present invention. The barium titanate layer dispersed in a cyanoethyl cellulose solution may be applied to the aluminum foil by spraying or preferably through the use of a doctor blade and then drying; the phosphor layer, likewise dispersed in a cyanoethyl cellulose solution, may then be applied over the barium titanate layer in the same way.

The conducting glass paper 9 consists of commercially available micro-fiber glass paper 0.001" thick, which is made conducting by dipping in a solution of a metal salt which upon drying and baking at an elevated temperature forms a conducting coating. A suitable solution consists of indium basic trifluoroacetate

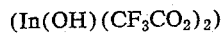

with stannic chloride (SnCl$_4$) dissolved in an organic solvent such as ethylene glycol monoethyl ether acetate. Reference may be made to copending application Serial No. 347,617, filed April 8, 1953, of Mary S. Jaffe, now Patent 2,849,339, "Indium Basic Trifluoroacetate and Method of Coating Vitreous Bodies Therewith," and assigned to the same assignee as the present invention for a more complete description of the materials and process used in making conducting glass paper.

In order to energize the electroluminescent cell, it is necessary to apply an alternating potential between the conductive layers, that is to the aluminum foil 6 and to the conductive glass paper 9. This may conveniently be effected by means of flattened flexible copper braids or ribbons 12, 13, the former being laid under the aluminum foil 6 between the foil and the lower envelope sheet 4, and the former being laid over the conductive glass paper 9, that is between the glass paper and low-density polyethylene sheet 11. The copper ribbons extend substantially to the edge of the polyethylene envelope sheets at one end and there overlie respectively a pair of laterally projecting copper screens 2, 3. During the laminating step, the copper ribbons become embedded in the thermoplastic sheets and are at the same time pressed against the aluminum foil or the conductive glass paper as the case may be. The ends of the copper ribbons and the copper screens 2, 3 likewise become embedded in the thermoplastic envelope sheets and are pressed in mutual contact. The ends of the screens projecting beyond the thermoplastic envelope serve as contact terminals.

It will be appreciated that when the cell is lit, the phosphor is energized and lights up to the margin 9' of the conductive glass paper. The band between the margin of the conductive glass paper at 9' and the aluminum foil from 9' to 6' is not illuminated and is opaque. The margin of the thermoplastic envelope projecting beyond the edge 6' of the aluminum foil does not light up but is transparent or at least translucent.

In the preferred laminating process in accordance with the invention, a vacuum procedure is used to purge the laid-up components of the cell of gases and at the same time to hold the parts in perfect registry until placed in the laminating press wherein a pneumatic or hydrostatic laminating procedure is used. Fig. 2 shows pictorially the vacuum plate 15 and Fig. 3 shows in section vacuum plate 15 and pressure plate 16 in place between the platens 17, 18 of a hydraulic press 19.

Referring particularly to Fig. 3, the vacuum plate consists of a flat polished metal plate, which may be circular as illustrated in the drawings, and whose upper surface consists at least in part of porous metal. Conveniently, a shallow circular recess may be machined out of the upper face of the vacuum plate and a circular plate or disc 21 of porous metal fitted therein. By porous metal is meant a metal having a substantial proportion of voids such as may be produced by powder metallurgy techniques involving pressing and sintering of metal powders. One such suitable material, well-known under the name of Oilite and used for permanently lubricated bearings, consists of bronze with approximately 30% voids. A hole 22 drilled edgewise through the vacuum plate communicates with a ring passage 23 underlying the edge of porous plate 21 and is provided with a fitting 24 to which a flexible rubber tube 25 (Fig. 2) may be connected for the application of a vacuum to the porous plate. The circular ring-like passage or groove 23 underlying the edge of the porous plate permits vacuum to be applied uniformly all around its periphery for more efficient venting of gases from the laid-up cell components. The vacuum plate is also provided in its upper surface near its outer edge with a narrow circular groove 26 which communicates with an edgewise drilled hole 27 provided with a fitting 28 to which may be attached a flexible rubber tube 29 for the application of vacuum thereto.

For convenience in laying up the cell components on the vacuum plate, it is removed from the press platen and laid on a suitable bench. In order that the electroluminescent lamp will not adhere to the vacuum plate after laminating under pressure and heat, a mold release agent is preferably first applied to the vacuum plate. A suitable mold release agent is a sheet of polyethylene terephthalate film known under the name Mylar and produced by E. I. du Pont de Nemours and Company. The Mylar sheet 30, as shown in Fig. 2, may extend in part over the edges of porous plate 21. It will be observed that some of the corners of the Mylar sheet extend beyond the porous plate; but the Mylar sheet must not cover entirely the porous plate because it is quite impervious to air and would then effectively prevent the application of vacuum to the cell lay-up. The electroluminescent cells are then laid-up over the Mylar sheet 30 in the manner which has been previously described, that is, first sheet 4 of high-density polyethylene, then aluminum foil 6 coated with the insulating and phosphor layers, then conducting glass paper sheet 9, then low-density polyethylene sheet 11, and finally high-density polyethylene sheet 5. In Fig. 3, the cell components are shown stacked in the proper order, the vertical height or thickness being greatly exaggerated for purposes of illustration. The copper ribbon connectors 12, 13 and copper screen terminals 2, 3 are also inserted in place. It may be convenient to assemble several cells at once: for instance, as illustrated in Fig. 2, a pair of lay-ups 31, 32 each comprising a pair of aluminum foil and conductive glass paper stackings with polyethylene sheets overlying both pairs are laid side by side and laminated at the same time.

During the lay-up or stacking of the cell components, vacuum may have been applied to the porous plate to assist in holding the components in place. If vacuum was not previously applied, it is now applied through tube 25 and the vacuum plate is then covered with an impervious sheet 33 to serve as a conformable diaphragm (shown transparent in Fig. 2 for ease of illustration). A suitable material for this purpose is a sheet of Mylar or a sheet of soft-annealed aluminum foil, the latter being preferred. Vacuum is also applied through tube 29 to ring 26 on the periphery of the vacuum plate; this helps to hold down diaphragm sheet 33 and to retain it in place. The diaphragm sheet is now pressed and rolled down flat over the cell lay-up by means of a hand roller 34 in order to drive any trapped air bubbles to the edges, there to be removed by the porous plate. Due to the vacuum applied through the porous plate, atmospheric pressure presses the diaphragm down on the vacuum plate and at the same time any gases or moisture trapped in the cell components are substantially removed. The stacked or laid-up cell components are also thereby maintained in registry.

Figure 4:
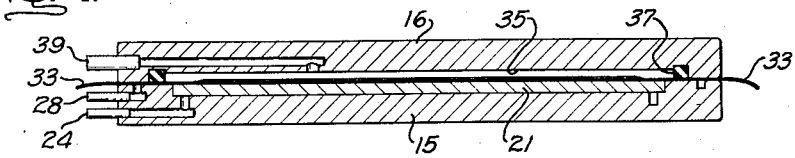
Fig. 4 is a vertical section view through the pressure and vacuum plates and cell during the laminating step.

Pressure plate 16 is now applied over vacuum plate 15 and the two are positioned between the platens of laminating press 19. It is immaterial whether the vacuum plate is positioned lowermost, as illustrated in Fig. 3, or uppermost. The application of vacuum to both the porous plate and the retaining groove in the vacuum plate is continued during the transfer and also during the pneumatic laminating step which follows, the flexible rubber tubes 25, 29 being of sufficient length to so permit. The lower surface of pressure plate 16 is machined out to form a shallow depression 35 surrounded by a deeper rectangular groove 36 in which is accommodated an O-ring 37 of high-temperature sealing rubber. A radial hole 38 communicates with the shallow depression 35 and is provided with a fitting 39 for the application of pressurized fluid or gas to the cavity formed between the vacuum and the pressure plates. The depth of the shallow depression 35 is not important so long as it be great enough to accommodate the thickest electroluminescent cell lay-up to be laminated, as illustrated in Fig. 4. It will be appreciated that the surface of the shallow depression 35 in the pressure plate does not engage the surface of the conformable diaphragm 33, the actual pressure against the diaphragm being exerted by the pressurized gas admitted into the cavity.

To laminate the cell, the press platens 17, 18 are clamped together, the upper platen being restrained by the side rods 40, 41 and the lower platen being driven upward by piston 42 working in a conventional hydraulic cylinder 43. The pressure plate 16 is thus forced down upon vacuum plate 15, and O-ring 37 pressing against conformable diaphragm 33 seals the space between the diaphragm and the upper surface of shallow depression 35 in the pressure plate. Compressed air, or compressed carbon dioxide if more convenient, is now admitted through coupling 39 into the sealed space of shallow depression 35 and exerts a hydrostatic pressure on the cell lay-up. Heat is supplied to the press platens by means of sheathed electrical resistance elements 44 embedded in the faces of both platens. The heat from the platens is communicated through the pressure and vacuum plates to the electroluminescent cell lay-up and causes the polyethylene sheets to soften. Due to the hydrostatic pressure on the conformable diaphragm, an even pressure is applied even to the edges of the heat-softenable materials in the lay-up so that there is not lateral distortion or unevenness in pressure from point to point. Where polyethylene is used, the pressure applied to the lay-up may be approximately 500 pounds per square inch, and the temperature in the range of 110° C. to 200° C. depending upon the grade. For instance, a temperature of 150° C. applied for a period of approximately 10 minutes is sufficient to fuse the plastic. The heating elements are then turned off and the plates cooled by circulating water or oil through cooling passageways 45 in the faces of the platens. After cooling, the pneumatic pressure and the vacuum are both released, the press is opened, and the finished laminated electroluminescent cell removed. The conformable diaphragm 33 and the lower Mylar mold-release sheet 30 are readily peeled off, and the laminated assemblies 31, 32 may be sheared in two, each then providing a pair of electroluminescent cells like that illustrated in Fig. 1.

The use of a hydraulic press is, of course, not necessary to the process in accordance with the invention since the laminating pressure applied to the electroluminescent cell lay-up is produced by the pressurized air or fluid acting upon the conformable diaphragm. Similar results could be obtained by placing the electroluminescent cell lay-up on its vacuum plate in a suitable autoclave capable of providing the required temperature and withstanding the necessary pressure.

The laminating process in accordance with the invention may also be used advantageously to laminate other electroluminescent cell construction than the preferred ones specifically described herein. For instance, it may be used to laminate electroluminescent cells similar to those described herein but wherein the conducting glass paper is replaced by a light-transmitting flexible sheet of high-melting point plastic such as polyethylene terephthalate (Mylar) coated with a thin layer of evaporated metal or semi-conductor such as gold metal or cuporos iodide. It may also be used to laminate cells wherein both conductive layers, that is the aluminum foil and the conducting glass paper of the cell described herein, are replaced by light-transmitting flexible sheets of high-melting point plastic made conductive by suitable treatment.

While a certain specific embodiment of the invention and a specific process for producing an electro-luminescent cell along with preferred equipment for practicing the process have been described in detail, the same is intended as illustrative and not in order to limit the invention thereto. The scope of the invention is to be determined by the appended claims.

What we claim as new and desire to secure by Letters Patent of the United States is:

1. A laminated evacuated electroluminescent cell assembly comprising an outer envelope of thermoplastic sheets of which at least the front sheet has a light-transmitting portion enclosing and overreaching at their marginal edges an electrically active assembly including a conducting foil coated with an electroluminescent phosphor dispersed in a plastic matrix to which is cemented a sheet of conductive fibers penetrated by thermoplastic material fused to the outer light-transmitting envelope sheet.

2. A laminated evacuated electroluminescent cell assembly comprising an outer envelope of light-transmitting flexible thermoplastic sheets enclosing and overreaching at their marginal edges an electrically active assembly including a conducting foil coated with an insulating layer of a high dielectric constant material dispersed in a plastic matrix and overcoated with an electroluminescent phosphor dispersed in a plastic matrix to which is cemented a sheet of conductive glass fibers penetrated by thermoplastic material fused to the outer thermoplastic envelope.

3. A flexible laminated evacuated electroluminescent cell comprising in stacked sequence a lowermost flexible thermoplastic sheet, a soft annealed metal foil coated on its upper face with a layer of electroluminescent phosphor embedded in a plastic matrix, said metal foil having its edges spaced from the edges of the thermoplastic sheet, a sheet thereover of conductive light-transmitting material leaving an uncovered margin around the edges of the metal foil, and an uppermost light-transmitting flexible thermoplstic sheet thereover, said thermoplastic sheets having juxtaposed margins projecting substantially beyond the edges of said metal foil and sealed together, the sheet of conductive light-transmitting material being adherent to the uppermost thermoplastic sheet and cemented to the phosphor layer on the metal foil.

4. A flexible laminated evacuated electroluminescent cell comprising in stacked sequence a lowermost high-density polyethylene sheet, a soft annealed metal foil coated on its upper face with a high dielectric constant material embedded in a plastic matrix and overcoated with a layer of electroluminescent phosphor likewise embedded in a plastic matrix, said metal foil having its edges spaced from the edges of the polyethylene sheet, a sheet thereover of conductive glass paper leaving an uncovered margin around the edges of the metal foil, a film thereover of low-density polyethylene and a sheet thereover of high-density polyethylene, the high density polyethylene sheets being fused along their margins, the fibrous glass paper being embedded in and penetrated by the low-density polyethylene sheet and cemented thereby to the phosphor layer on the metal foil.

5. A flexible laminated evacuated electroluminescent cell comprising in stacked sequence a lowermost high-density polyethylene sheet, a soft annealed aluminum foil coated on its upper face with a high dielectric constant material embedded in a plastic matrix and overcoated with a layer of electroluminescent phosphor likewise embedded in a plastic matrix, said aluminum foil having its edges spaced from the edges of the polyethylene sheet, a sheet thereover of conductive glass paper leaving an uncovered margin around the edges of the aluminum foil, a film thereover of low-density polyethylene and a sheet thereover of high-density polyethylene, the polyethylene sheets having juxtaposed margins projecting substantially beyond the edges of said aluminum foil and fused together, the fibrous glass paper being embedded in and penetrated by the low-density polyethylene sheet and cemented thereby to the phosphor layer on the aluminum foil and fused to the upper high-density polyethylene sheet.

6. A flexible laminated evacuated electroluminescent cell comprising in stacked sequence a lowermost high-density polyethylene sheet, a soft annealed aluminum foil coated on its upper face with a high dielectric constant material embedded in a plastic matrix and overcoated with a layer of electroluminescent phosphor likewise embedded in a plastic matrix, said aluminum foil having its edges spaced from the edges of the polyethylene sheet, a sheet thereover of conductive glass paper leaving an uncovered margin around the edges of the aluminum foil, a film thereover of low-density polyethylene and a sheet thereover of high-density polyethylene, the high-density polyethylene sheets being fused along their margins, the fibrous glass paper being embedded in and penetrated by the low-density polyethylene sheet and cemented thereby to the phosphor layer on the aluminum foil and to the upper high-density polyethylene sheet, and contacts comprising flexible metallic conductors one of them being embedded in the lowermost polyethylene sheet and pressed against the aluminum foil and the other being embedded in the low-density polyethylene sheet and pressed against the conductive glass paper.

7. A method of making an electroluminescent cell comprising positioning an electroluminescent cell lay-up, including outer thermoplastic sheets enclosing and overreaching inner electrically active components comprising a conducting sheet coated with an electroluminescent phosphor having positioned thereagainst a light-transmitting conductive sheet, on a vacuum plate having a porous portion, applying an impermeable conformable diaphragm over said vacuum plate to cover the lay-up and the porous portion of the plate, and applying a vacuum to the porous portion and heat to the lay-up in order to exhaust and fuse the cell.

8. A method of making an electroluminescent cell comprising positioning an electroluminescent cell lay-up, including outer thermoplastic sheets enclosing and overreaching inner electrically active components comprising a conductive sheet coated with an electroluminescent phosphor having positioned thereagainst a light-transmitting conductive sheet, on a vacuum plate having a porous portion in a manner to leave at least a part of the porous portion uncovered, applying a conformable diaphragm over said vacuum plate to cover the electroluminescent lay-up and the porous portion of the plate, applying a vacuum to the porous portion in order to remove air and moisture from the lay-up, and applying hydrostatic pressure to the conformable diaphragm and heat to the lay-up in order to press and fuse the cell.

9. Apparatus for laminating an electroluminescent cell lay-up of the kind comprising outer thermoplastic sheets enclosing and overreaching inner electrically active components including a metal foil coated with an electroluminescent phosphor having positioned thereagainst a sheet of conducting glass paper, comprising a smooth-surfaced vacuum plate having a porous portion for positioning said lay-up thereupon, an impermeable conformable diaphragm for application over said vacuum plate to cover the electroluminescent lay-up and the porous portion of the plate, a pressure plate fitting over said vacuum plate and adapted to make a hermetic seal with said diaphragm, said pressure plate having a cavity therein for accommodating said lay-up, means for clamping the vacuum and pressure plates together, means for applying a vacuum to said porous portion of the vacuum plate, means for applying hydrostatic pressure between the pressure plate and conformable diaphragm, and means for heating the vacuum and pressure plates.

References Cited in the file of this patent

UNITED STATES PATENTS

| | | |
|---|---|---|
| 2,183,256 | Gabler | Dec. 12, 1939 |
| 2,222,788 | Touceda et al. | Nov. 26, 1940 |
| 2,755,406 | Burns | July 17, 1956 |
| 2,765,419 | Roberts | Oct. 2, 1956 |
| 2,774,004 | Jaffe | Dec. 11, 1956 |
| 2,791,723 | Nagy et al. | May 7, 1957 |

FOREIGN PATENTS

| | | |
|---|---|---|
| 530,011 | Canada | Sept. 4, 1956 |
| 764,867 | Great Britain | Jan. 2, 1957 |